May 12, 1959
C. E. BUCK
2,886,720
COORDINATOR FOR WINDSHIELD WASHER AND WIPERS
Filed Jan. 12, 1956
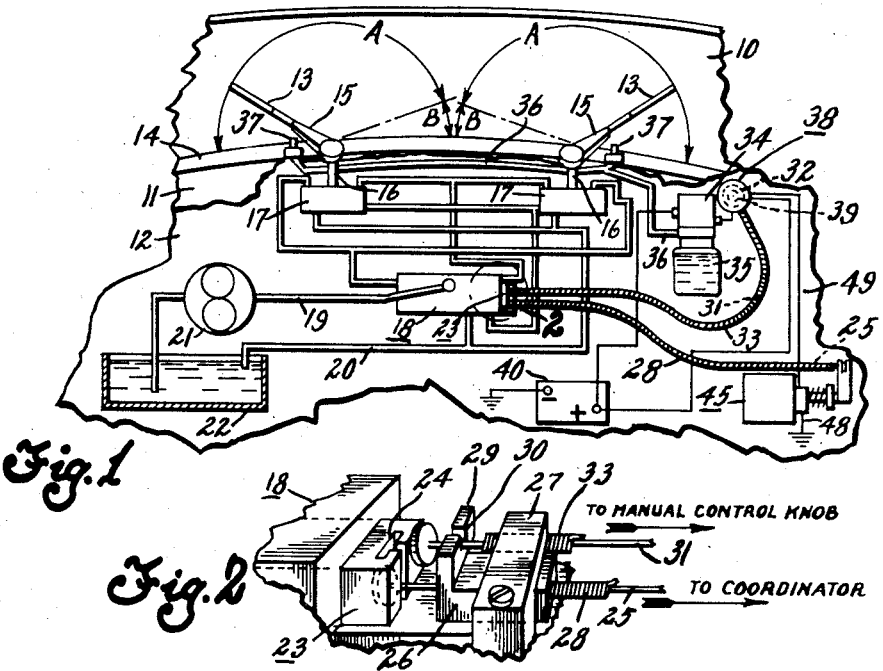
Fig. 1
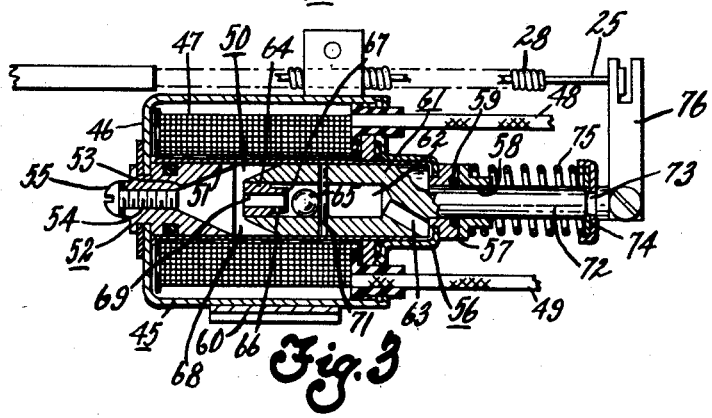
Fig. 2
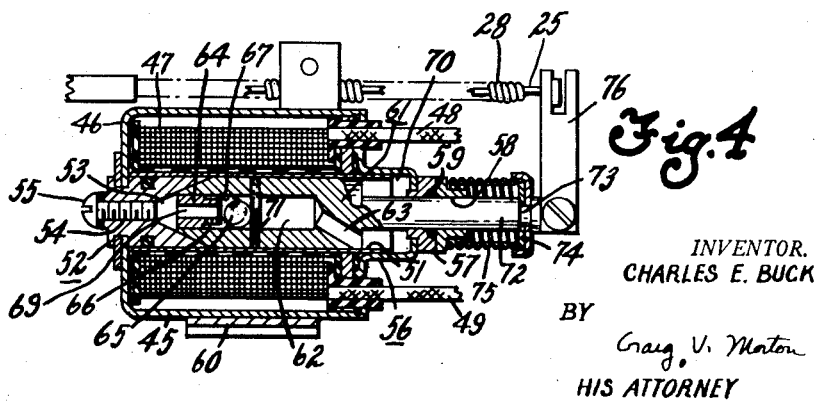
Fig. 3
Fig. 4
INVENTOR.
CHARLES E. BUCK
BY
Craig V. Morton
HIS ATTORNEY United States Patent Office 2,886,720
Patented May 12, 1959

2,886,720

COORDINATOR FOR WINDSHIELD WASHER AND WIPERS

Charles E. Buck, Anderson, Ind., assignor to General Motors Corporation, Detroit, Mich., a corporation of Delaware Application January 12, 1956, Serial No. 558,702

5 Claims. (Cl. 310—19)

This invention pertains to the art of windshield cleaning, and particularly to a coordinator for effecting automatic timed operation of vehicle windshield wipers during operation of a washer.

Heretofore, devices for coordinating the operation of a vehicle washer and wipers have been manufactured and sold commercially. One of the most popular coordinators, now available, is of the spring-biased, vacuum dashpot type. The vacuum dashpot type coordinator is ordinarily used in conjunction with a vacuum wiper motor and an electrically controlled, vacuum operated washer pump. In this type of system, when the washer switch is closed, a vacuum valve is opened by a solenoid and the intake stroke of the washer pump is effected. Upon initiation of the delivery stroke, a pressure operated valve is actuated by the washer fluid being discharged so as to apply vacuum to the coordinator which thereby initiates wiper motor operation. After the delivery stroke of the washer pump is completed, the coordinator vacuum supply is interrupted, and a coordinator return spring becomes operative to interrupt wiper motor operation. However, the interruption of wiper motor operation is delayed by the dashpot for a timed interval so that the windshield wiper motor continues to operate after the spray of washer fluid has stopped. The present invention relates to an electrically actuated, spring returned liquid dashpot coordinator, specifically designed for use with an electric washer pump and any type of wiper motor, i.e. vacuum, hydraulic or electric. The instant coordinator, however, times the entire interval of wiper motor operation, rather than merely timing the period of wiper operation after the discharge of washer fluid has stopped as is the case in the coordinator referred to hereinbefore. Accordingly, among my objects are the provision of means for coordinating the operation of a washer and windshield wipers; the further provision of coordinating means which time the entire interval of wiper motor operation after initiation of the delivery stroke of the washer; the further provision of an electrically actuated coordinator for vehicle windshield washer and wiping means; and the still further provision of a coordinator having liquid dashpot means for timing the entire interval of wiper motor operation.

The aforementioned and other objects are accomplished in the present invention by incorporating means in the coordinator which initiate wiper motor operation and means for timing the entire interval of wiper operation thereafter. Specifically, the coordinator includes a case which encloses a solenoid coil. The solenoid coil is in the form of an annulus and a sealed chamber is formed in the central opening thereof. A reciprocable plunger of magnetic material is disposed within the sealed chamber, the plunger having a rod which extends without the casing and sealed chamber. A compression spring encircles the plunger rod, one end of the spring abutting a seal retainer and the other end of the spring abutting a washer assembly attached to the plunger rod. The plunger is formed with a central recess that connects with a passage therethrough. A plug is disposed in one end of the plunger recess, the plug constituting a check valve seat and having a calibrated bleed orifice bypassing the check valve seat. A ball type check valve is confined within the plunger recess between the plug and a cross pin. The sealed chamber is filled with silicone fluid which flows from the head end of the plunger to the rod end thereof when the solenoid coil is energized to effect movement of the plunger in one direction. The return spring moves the plunger in the opposite direction after deenergization of the solenoid, and at this time, the ball type check valve engages its seat and return movement of the plunger is delayed and controlled by the flow of silicone fluid through the calibrated bleed orifice. This arrangement, in effect, constitutes a dashpot. Movement of the plunger upon energization of the solenoid coil is limited by a stop, and movement of the plunger by the return spring is limited by the seal retainer.

The plunger is operatively connected to a coordinator Bowden wire which is enclosed in a Bowden conduit, the Bowden conduit being rigidly secured to the coordinator casing. The other end of the coordinator Bowden control wire is secured to the wiper motor control valve assembly, which may be of the type disclosed in copending application, Serial No. 558,690, now Patent No. 2,829,626, Walter H. West, which controls wiper motor means of the type disclosed in copending application, Serial No. 558,640, now Patent No. 2,828,722, Arthur F. Bohnhoff, et al., both of these applications being filed of even date herewith and assigned to the assignee of this invention.

The specific washer pump for which the coordinator of this invention was designed for use is disclosed in copending application, Serial No. 342,534, Bolles, et al., filed March 16, 1953, and assigned to the assignee of this invention, now Patent No. 2,757,615. Thus, the washer pump has an electrically effected intake stroke and a spring effected delivery stroke. The coordinator solenoid and the washer pump solenoid are energized simultaneously from a single switch. In so doing, operation of the windshield wiper motor means is initiated and the intake stroke of the pump is effected. When the switch is opened, the delivery stroke of the pump begins and wiper motor means operation is timed by the dashpot. The timing by the coordinator dashpot is such that wiper motor operation continues for several cycles after the delivery stroke of the washer pump has been completed. In other words, the windshield wipers dry the windshield after the spray of washer fluid has stopped.

Further objects and advantages of the present invention will be apparent from the following description, reference being had to the accompanying drawings wherein a preferred embodiment of the present invention is clearly shown.

In the drawings:

Fig. 1 is a schematic view illustrating a windshield cleaning mechanism including the coordinator assembly of this invention.

Fig. 2 is an enlarged fragmentary view of an alternator control valve taken in the area of dot-dash circle 2 in Fig. 1.

Fig. 3 is a sectional view of the coordinator showing its plunger in the off position.

Fig. 4 is a view similar to Fig. 3 showing the coordinator plunger in an operating position.

With particular reference to Fig. 1, a windshield cleaning installation for a vehicle is depicted, the vehicle including a windshield 10, a firewall 11 and an engine compartment 12. The windshield cleaning apparatus includes a pair of spaced wiper blades 13 arranged for asymmetrical movement across the outer surface of the windshield. As is conventional practice, the wiper blades are moved throughout a wiping stroke A and into a parked position throughout the angle $A+B$ so as to come to rest adjacent the vehicle cowl 14 when wiper motor operation is interrupted.

The wiper blades are detachably connected to wiper arms 15 which are, in turn, drivingly connected to spaced transmission shaft assemblies 16 which extend through the vehicle cowl 14 beneath the vehicle instrument panel. In the arrangement depicted, each transmission shaft assembly is connected to an independent hydraulic wiper motor 17 of the type disclosed in the aforementioned copending application, Serial No. 558,640, now Patent No. 2,828,722. The two motors 17 are controlled by an alternator control valve assembly of the type disclosed in the aforementioned copending application, Serial No. 558,690, now Patent No. 2,829,626. The alternator control valve assembly 18 is connected by pressure and drain lines 19 and 20, respectively, to a source of fluid under pressure which may comprise a pump 21 having connections with a reservoir 22.

The alternator control valve assembly 18 includes a manually operable control valve 23 having a slot 24 therein which receives the end of a coordinator Bowden control wire 25. The coordinator control wire extends through a guide 26 which is attached to the alternator control valve housing by a screw retainer 27. The conduit 28 for the Bowden wire 25 is attached to the guide 26 and the guide is formed with an upstanding shoulder 29 having a slot 30 therein through which the Bowden control wire 31, which is connected to an instrument panel knob 32 extends. The end of the instrument panel control wire 31 engages the end of the manual control valve 23, and the conduit 33 therefor is attached to the alternator control valve housing by a screw.

The cleaning apparatus also includes an electrically operated washer pump 34 of the type disclosed in the aforementioned copending application, Serial No. 342,534, now Patent No. 2,757,615. This pump includes a solenoid winding, which, when energized, effects the intake stroke of the pump plunger thereby drawing washer solvent from a reservoir 35 into the pump chamber. During the intake stroke of the pump plunger a spring is compressed, and when the solenoid coil is deenergized, the spring effects the discharge stroke whereby washer fluid flows through conduits 36 to the washer nozzles 37 and is thereby discharged onto the windshield 10 in the path of the wiper blades 13. Energization of the washer pump solenoid is controlled by an instrument panel mounted switch 38 which is operable by a button 39. The solenoid coil for the washer pump is energized from any suitable source of electric power, such as the vehicle battery 40.

In addition, the instrument panel switch 38 controls the energization of a coordinator solenoid coil which constitutes a component of the coordinator assembly generally depicted by the numeral 45. Thus, the washer pump solenoid coil and the coordinator solenoid coil are both energized and deenergized simultaneously by manipulating the instrument panel button 39. If desired, the washer and coordinator control button may be mounted coaxially with the wiper control knob 32.

The coordinator assembly comprises a casing 46 having disposed therein the solenoid coil 47, one terminal 48 of which is connected to ground and the other terminal 49 of which is connected through the switch to the battery. The solenoid coil 47 is in the form of an annulus, and within the recess thereof a sealed chamber, or cylinder, 50 is formed. The sidewalls of the cylinder are constituted by a tube 51, one end of which is closed by a stop plug 52 having a conical recess 53 therein with a screw threaded opening 54. The screw threaded opening is closed by a screw 55 which may be removed to permit filling of the chamber with silicone fluid. The other end of the sealed chamber, or cylinder 50, is closed by a cover assembly 56 which carries a seal retainer 57 having a central aperture 58 and containing an O-ring seal 59.

The casing of the coordinator has attached thereto a bracket 60 by which means the coordinator can be attached to the vehicle firewall.

A reciprocable plunger 61 is disposed within the sealed chamber 50, the plunger being of magnetic material and having a central recess 62 that communicates with a through passage 63. The inner end of the plunger 61 is of frusto conical shape, and a plug 64 constituting a seat for a ball type check valve 65 is disposed within the recess. The plug 64 has a calibrated bleed orifice 66 which bypasses the check valve seat 67 to permit flow of silicone fluid to chamber 68 through the central recess 69 in the plug 64, the recess 62 in the plunger 61 and through passage 63 from chamber 70 during movement of the plunger to the right. The ball check valve 65 is retained between the check valve seat 67 constituted by the plug 64 and a cross pin 71.

The plunger 61 includes an axially extending rod 72 which is sealingly engaged by the O-ring 59 and extends without the sealed chamber 50. The rod is formed with an annular groove 73 within which a washer assembly 74 is disposed. A coiled compression spring 75 encircles the rod 72, one end of the spring abutting the seal retainer 57 and the other end of the spring abutting the washer assembly 74. In addition, the end of the plunger has attached thereto a control arm 76 to which the other end of the coordinator Bowden control wire 25 is secured. The conduit for the coordinator Bowden control wire is also attached to the coordinator casing 46.

When the solenoid coil 47 of the coordinator is energized, the plunger 61 moves to the left into engagement with the stop 52. During this movement, energy is stored in the spring 75 and the silicone fluid can flow freely from chamber 68 to chamber 70 through the open check valve 65, the plunger recess 62 and the through passage 63. Upon deenergization of the solenoid coil 47, the spring 75 will immediately initiate movement of the plunger 61 to the right and at this time, the ball 65 will engage its seat 67 and the fluid can only flow from chamber 70 to chamber 68 through the passage 63, the recess 62, and the calibrated bleed orifice 66. This arrangement provides a dashpot effect and delays return movement of the plunger for a timed interval during which the coordinator Bowden control wire 25 will maintain the manual control valve 23 in the "On" position so that the wiper blades 13 will be oscillated throughout their wiping stroke A. When the plunger returns to the position depicted in Fig. 3, operation of the wiper motors will be interrupted and the blades will be moved to the parked position.

*Operation*

Operation of the vehicle cleaning system including the coordinator of this invention is as follows. When the wiper control knob 32 is manipulated, the wiper motors will be activated independently of the washer pump and the coordinator through Bowden wire 31. If the operator desires to apply a washer fluid to the windshield at this time, the control button 39 is depressed, thereby energizing the solenoid coils of the washer pump 34 and the coordinator 45. When the button is released, washer fluid will be discharged onto the windshield into the paths of the moving wiper blades. However, since the wiper motor is being controlled by the wiper control knob 32, the coordinator operation will have no effect thereon. To turn off the wiper motor, the wiper control knob is turned to withdraw the Bowden wire 31, and the coordinator spring returns the control valve to the "Off" position through the coordinator Bowden wire 25.

On the other hand, if the wiper motor means are off, or not operating, and the driver decides to clean the windshield, he need only depress the control button 39, thereby energizing the solenoid coils of both the washer pump and the coordinator. When the coordinator solenoid coil 47 is energized, the wiper motor means will be activated due to movement of the plunger 61 and movement of the coordinator Bowden control wire 25 as effected thereby. When the button 39 is released, water will be discharged onto the windshield and the coordinator dashpot means will begin timing operation of the windshield wiper motors. The calibrated bleed orifice 66 is designed so that the wiper blades 13 will make several strokes throughout the angle A after the discharge of washer fluid has terminated. Thereafter, the coordinator plunger 61 will return to the "Off" position and interrupt motor operation, at which time the blades will be moved to the parked position.

From the foregoing, it is apparent that the present invention provides a coordinator which times the duration of wiper motor means operation after initiation of the discharge, or delivery, stroke of the washer pump. Moreover, the coordinator is designed so that it does not require any external adjustments and, moreover, may be used to control the operation of any type of windshield wiper motor, namely, vacuum, hydraulic or electrical type.

While the embodiment of the present invention as herein disclosed, constitutes a preferred form, it is to be understood that other forms might be adopted.

What is claimed is as follows:

1. A coordinator for initiating and timing the operation of windshield wiper motor means during operation of washer pump means including, a cylinder constituting a sealed chamber having a liquid therein, a reciprocable plunger disposed in said cylinder, said plunger having a passage therethrough, a one-way check valve carried by said plunger and operable to open said passage to permit the free flow of liquid therethrough during movement of said plunger in one direction and to close said passage during movement of said plunger in the opposite direction, a wiper motor means control element operatively connected to said plunger so as to be positioned thereby, electrically actuated means for effecting movement of said plunger in said one direction to position said control element and initiate operation of said wiper motor means, power means activated by operation of said electrically actuated means and operable upon deenergization thereof for effecting movement of said plunger in the opposite direction, and liquid flow restricting means by-passing said one-way check valve to control the time required for return movement of said plunger by said power means.

2. A coordinator for initiating and timing the operation of windshield wiper motor means during operation of washer pump means including, a cylinder constituting a sealed chamber having a liquid therein, a reciprocable plunger disposed in said cylinder, said plunger having a passage therethrough, a one-way check valve carried by said plunger and operable to open said passage to permit the free flow of liquid therethrough during movement of said plunger in one direction and to close said passage during movement of said plunger in the opposite direction, a wiper motor means control element operatively connected to said plunger so as to be positioned thereby, electrically actuated means for effecting movement of said plunger in said one direction to position said control element and initiate operation of said wiper motor means, energy storing means activated upon energization of said electrically actuated means and operable upon deenergization thereof for effecting movement of said plunger in the opposite direction, and liquid flow restricting means by-passing said one-way check valve to control the time required for return movement of said plunger by said energy storing means.

3. A coordinator for initiating and timing the operation of windshield wiper motor means during operation of washer pump means including, a cylinder constituting a sealed chamber having a liquid therein, a reciprocable plunger disposed in said cylinder, said plunger having a passage therethrough, a one-way check valve carried by said plunger and operable to open said passage and permit the free flow of liquid therethrough during movement of said plunger in one direction and to close said passage during movement of said plunger in the opposite direction, a wiper motor means control element operatively connected to said plunger so as to be positioned thereby, electrically actuated means for effecting movement of said plunger in said one direction to position said control element and initiate operation of said wiper motor means, energy storing means activated upon energization of said electrically actuated means and operable upon deenergization thereof for effecting movement of said plunger in the opposite direction, and a calibrated orifice by-passing said check valve for controlling the rate of movement of said plunger by said energy storing means.

4. A coordinator for initiating and timing the operation of windshield wiper motor means during operation of washer pump means including, a cylinder constituting a sealed chamber having a liquid therein, a reciprocable plunger of magnetic material disposed in said cylinder, said plunger having a passage therethrough, a hollow plug disposed in one end of said passage and constituting a valve seat, a one-way check valve disposed within said passage and engageable with said valve seat, said check valve being disengaged from said valve seat during movement of said plunger in one direction and engaged with said valve seat during movement of said plunger in the opposite direction, a wiper motor means control element operatively connected to said plunger so as to be positioned thereby, solenoid means which, when energized, effect movement of said plunger in said one direction to position said control element and initiate operation of the wiper motor means, power means for effecting movement of said plunger in the opposite direction, and a calibrated orifice in said plug by-passing said valve seat for controlling the rate of movement in the opposite direction by said second power means.

5. A coordinator for initiating and timing the operation of windshield wiper motor means during operation of washer pump means including, a cylinder constituting a sealed chamber having a liquid therein, a reciprocable plunger of magnetic material disposed in said cylinder, said plunger having a pasage therethrough, a hollow plug disposed in one end of said passage and constituting a valve seat, a one-way check valve disposed within said passage and engageable with said valve seat, said check valve being disengaged from said valve seat during movement of said plunger in one direction and engaged with said valve seat during movement of said plunger in the opposite direction, a wiper motor means control element operatively connected to said plunger so as to be positioned thereby, solenoid means which, when energized, effect movement of said plunger in said one direction to position said control element and initiate operation of the wiper motor means, energy storing means activated upon movement of said plunger by said solenoid and operable upon deenergization of said solenoid to effect movement of the plunger in the opposite direction, and a calibrated orifice in said plug by-passing said valve seat for controlling the rate of movement of said plunger by said energy storing means.

References Cited in the file of this patent

UNITED STATES PATENTS

| | | |
|---|---|---|
| 308,548 | Blodgett et al. | Nov. 25, 1884 |
| 533,108 | Wirt | Jan. 29, 1895 |
| 1,187,625 | Jacobsen | June 20, 1916 |
| 1,530,632 | Watson | Mar. 24, 1925 |
| 1,728,135 | Pillion | Sept. 10, 1929 |
| 1,868,256 | Rippl | July 19, 1932 |
| 2,514,002 | Long | July 4, 1950 |
| 2,743,473 | Oishei | May 1, 1956 |

FOREIGN PATENTS

| | | |
|---|---|---|
| 705,140 | Great Britain | Mar. 10, 1954 |